United States Patent
Kodati et al.

(10) Patent No.: US 11,584,530 B2
(45) Date of Patent: Feb. 21, 2023

(54) BUTTERFLY LEAFS FOR ECONOMY SEAT MIDDLE HANDLE

(71) Applicant: B/E Aerospace, Inc., Winston-Salem, NC (US)

(72) Inventors: Sambasiva Rao Kodati, Kaikalur (IN); Abhishek Choudhary, Secunderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/407,550

(22) Filed: Aug. 20, 2021

(65) Prior Publication Data

US 2022/0081118 A1   Mar. 17, 2022

(51) Int. Cl.
*B64D 11/06* (2006.01)

(52) U.S. Cl.
CPC ................. *B64D 11/0644* (2014.12)

(58) Field of Classification Search
CPC .................................................. B64D 11/0644
See application file for complete search history.

(56) References Cited

U.S. PATENT DOCUMENTS

| | | | |
|---|---|---|---|
| 5,331,453 A | 7/1994 | Lipsky | |
| 9,248,765 B2 * | 2/2016 | Friedlander | B60N 2/79 |
| 9,468,302 B2 | 10/2016 | Negusse | |
| 9,616,785 B2 | 4/2017 | Marini et al. | |
| 2010/0171350 A1 | 7/2010 | Large et al. | |

FOREIGN PATENT DOCUMENTS

| | | |
|---|---|---|
| CN | 107757442 A | 3/2018 |
| DE | 19947871 C1 | 3/2001 |
| FR | 2877288 B1 | 5/2008 |
| JP | S59186749 A | 10/1984 |
| KR | 101724744 B1 | 4/2017 |
| KR | 102151953 B1 | 9/2020 |
| WO | 2011063399 A2 | 5/2011 |

OTHER PUBLICATIONS

Extended Search Report in European Application No. 21197098.3 dated Feb. 4, 2022, 11 pages.
Soarigami, "Portable Airplane Armrest Extender/Divider", URL: https://www.amazon.com/Soarigami-Airplane-Portable-Armrest-Extender/dp/B0725KDSW2, Downloaded Jul. 13, 2020, 9 pages.

* cited by examiner

*Primary Examiner* — Anthony D Barfield
(74) *Attorney, Agent, or Firm* — Suiter Swantz pc llo

(57) ABSTRACT

A stowable armrest extension rotates or translates from the armrest and deploys into one or more horizontal extensions. Linking elements connect the movement of various components to direct, restrict, and automate deployment. A central column may isolate the butterfly leafs to prevent incidental contact between neighboring passengers. An actuator may apply a force to deploy the stowable armrest extension, either when a release is activated or when a top cap is moved.

12 Claims, 19 Drawing Sheets

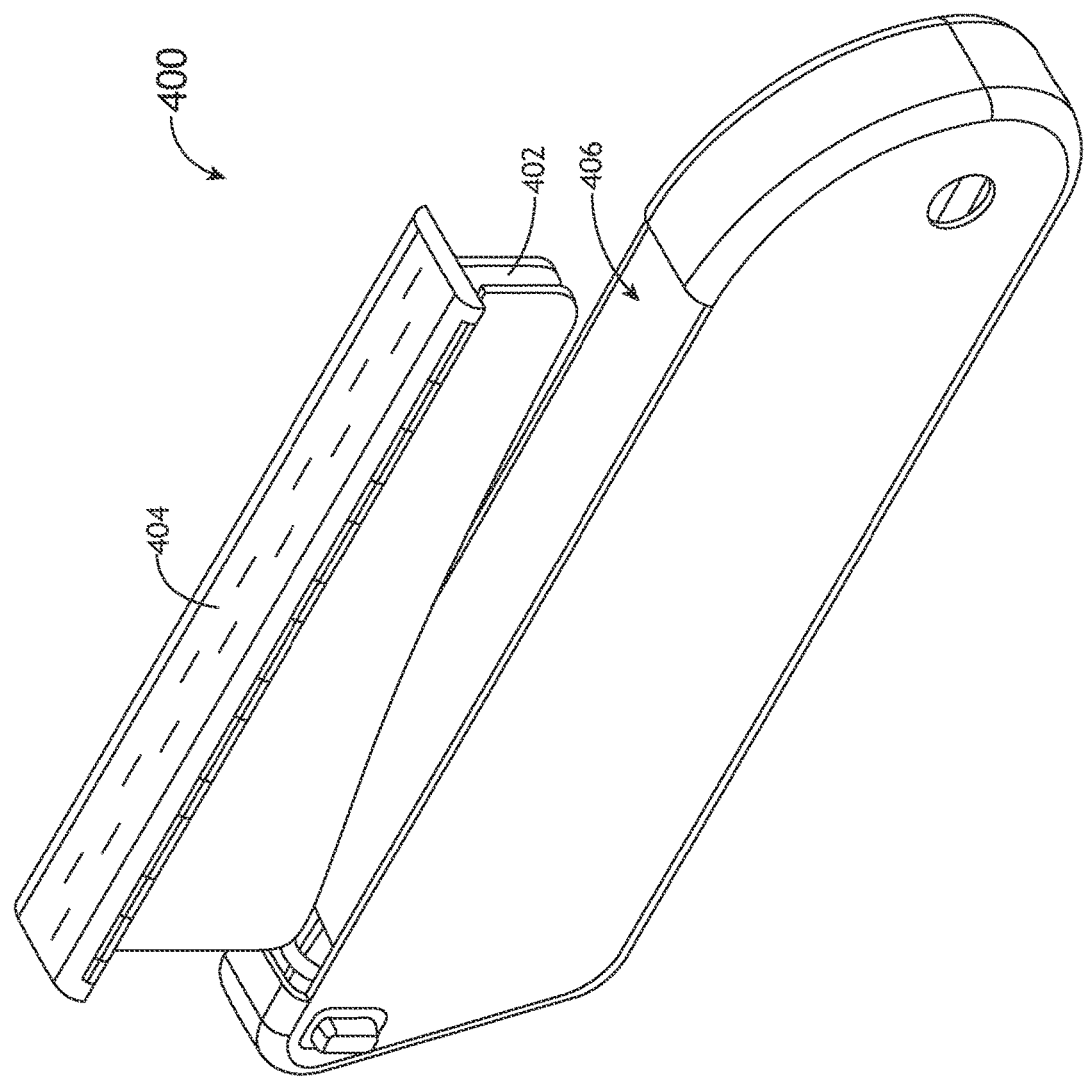

BUTTERFLY LEAFS FOR ECONOMY SEAT MIDDLE HANDLE

PRIORITY

The present application claims the benefit under 35 U.S.C. § 119(a) of Indian Prov. App. No. 202011040210 (filed Sep. 16, 2020), which is incorporated herein by reference.

BACKGROUND

Aircraft cabin space is very limited. Especially in economy class, shared armrests are generally not usable by both passengers at once, which is inconvenient; however, there is no mechanism for increasing armrest space within existing space constraints.

SUMMARY

In one aspect, embodiments of the inventive concepts disclosed herein are directed to a stowable armrest extension. The stowable armrest extension may rotate or translate from the armrest and deploy into one or more horizontal extensions.

In a further aspect, linking elements connect the movement of various components to direct, restrict, and automate deployment. A central column may isolate the butterfly leafs to prevent incidental contact between neighboring passengers.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which:

FIG. 4A shows a perspective view of an armrest with a deployable armrest extension during a stage of deployment according to an exemplary embodiment;

DETAILED DESCRIPTION

Figure 1A:
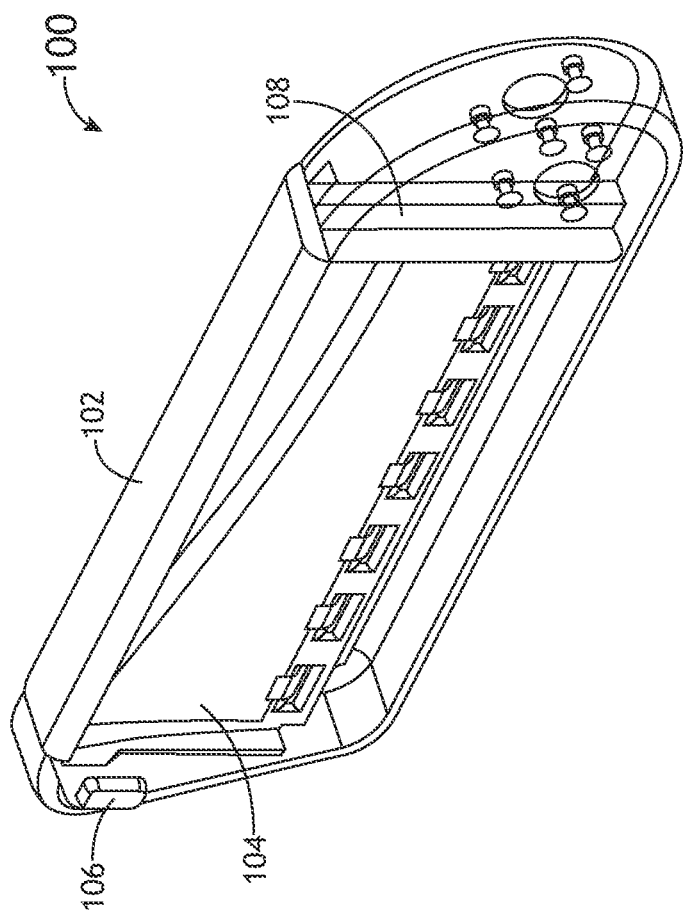
FIG. 1A shows a perspective view of an armrest with a deployable armrest extension during a stage of deployment according to an exemplary embodiment.
Figure 1B:
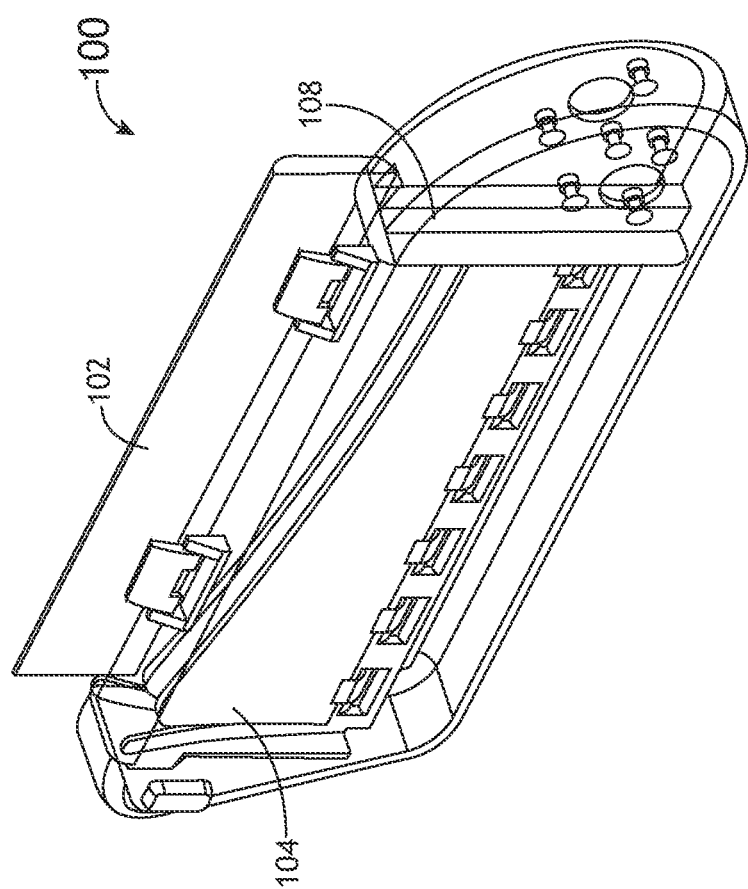
FIG. 1B shows a perspective view of an armrest with a deployable armrest extension during a stage of deployment according to an exemplary embodiment.
Figure 1C:
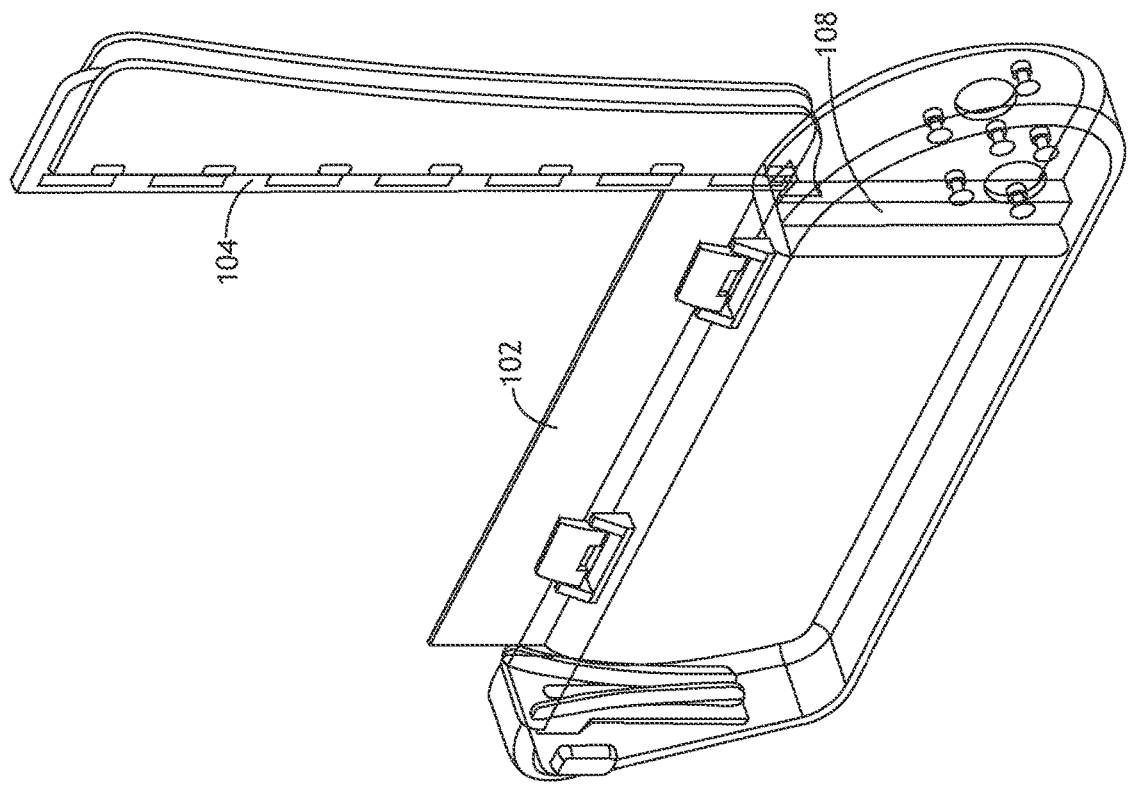
FIG. 1C shows a perspective view of an armrest with a deployable armrest extension during a stage of deployment according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a stowable armrest extension that rotates or translates from the armrest and deploys into one or more horizontal extensions. Linking elements connect the movement of various components to direct, restrict, and automate deployment. A central column may isolate the butterfly leafs to prevent incidental contact between neighboring passengers.

Referring to FIGS. 1A-1F, perspective views of an armrest 100 with a deployable armrest extension 104 according to an exemplary embodiment are shown at various stages of deployment. When fully stowed (as in FIG. 1A), the deployable armrest extension 104 is completely contained within an internal space defined by the body of the armrest 100.

A top cap 102 covers an opening in a top surface of the armrest 100. During a first stage of deployment (as in FIG. 1B), the top cap 102 is opened. In at least one embodiment, the top cap 102 is configured to rotate on one or more hinges attached to the armrest 100. In at least one embodiment, the deployable armrest extension 104 may translate vertically out of the opening in the top surface via a deployment mechanism 108. Alternatively, or in addition, the deployment mechanism 108 may include an extension arm configured to allow the deployable armrest extension 104 to rotate (as in FIG. 1C).

Figure 1D:
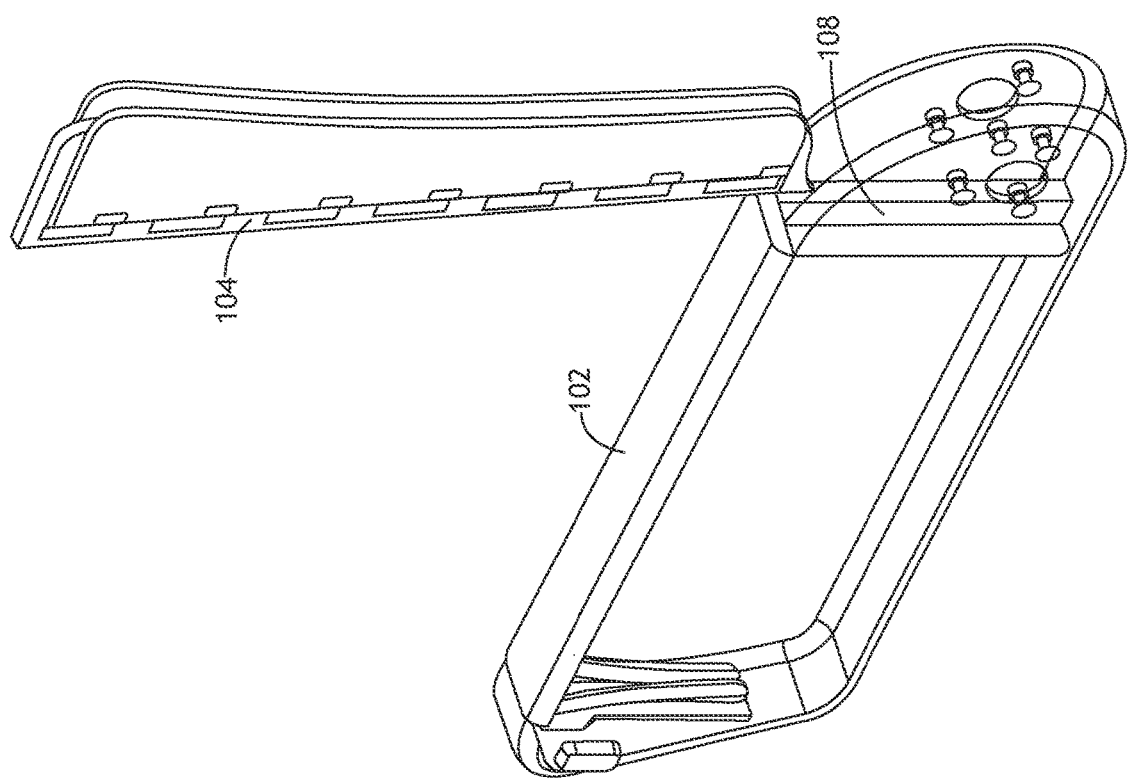
FIG. 1D shows a perspective view of an armrest with a deployable armrest extension during a stage of deployment according to an exemplary embodiment.
Figure 1E:
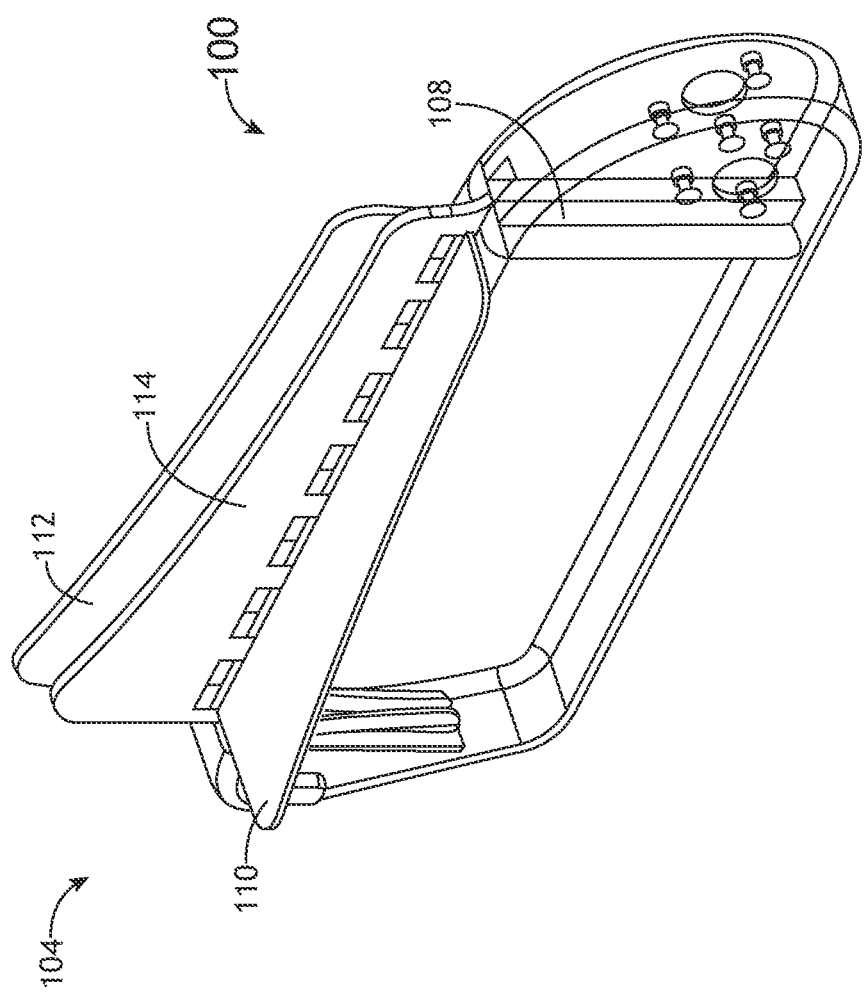
FIG. 1E shows a perspective view of an armrest with a deployable armrest extension during a stage of deployment according to an exemplary embodiment.
Figure 1F:
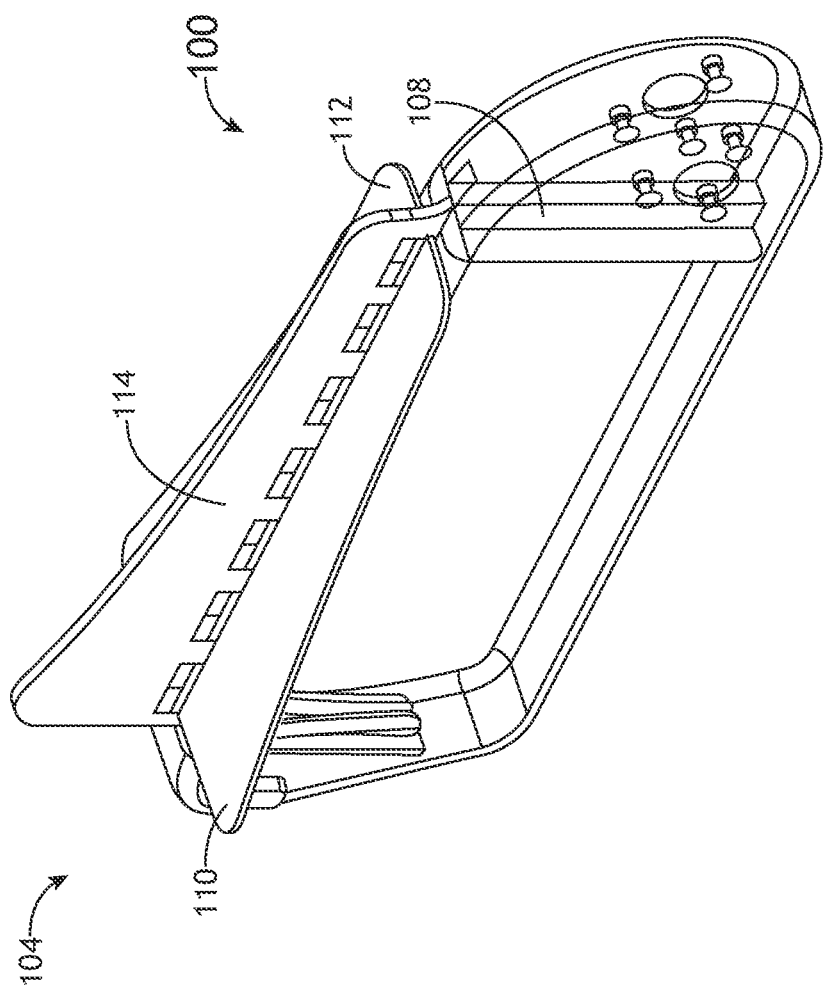
FIG. 1F shows a perspective view of an armrest with a deployable armrest extension during a stage of deployment according to an exemplary embodiment.

In at least one embodiment, when the deployable armrest extension 104 has cleared the opening in the top surface, the top cap 102 may be closed to cover the opening in the top surface (as in FIG. 1D). Then the deployable armrest extension 104 can be rotated to rest on the top surface of the top cap 102 (as in FIG. 1E). In at least one embodiment, the deployable armrest extension 104 may comprise hinged leafs 110, 112 that deploy horizontally to provide additional armrest space (as in FIG. 1F). The deployable armrest extension 104 may also include a central column 114 which may engage the deployment mechanism 108, for example one or more vertical translation channels defined by the deployment mechanism 108. The central column 114 may also segregate the hinged leafs 110, 112 to prevent incidental contact between passengers utilizing the armrest 100.

Referring to FIGS. 2A-2E, perspective, environmental views of an armrest 200 with a deployable armrest extension 202 according to an exemplary embodiment are shown at various stages of deployment. When fully deployed (as in FIG. 2A), hinged leafs 204, 206 extend horizontally from a central column 208. When stowing, the hinged leafs 204, 206 are folded toward the central column 208 (as in FIG. 2B) either manually (by the passengers) or automatically (by interaction with the surrounding armrest structure). The deployable armrest extension 202 is then translated downward into an internal space defined by the armrest 200 (as in FIG. 2C). A deployment mechanism 108 (FIG. 1) may include channels to direct the translation of the deployable armrest extension 202. Furthermore, in at least one embodiment, the deployment mechanism 108 may include an actuator such as a spring or pneumatic mechanism configured to bias the deployable armrest extension 202 into a deployed configuration.

Figure 2A:
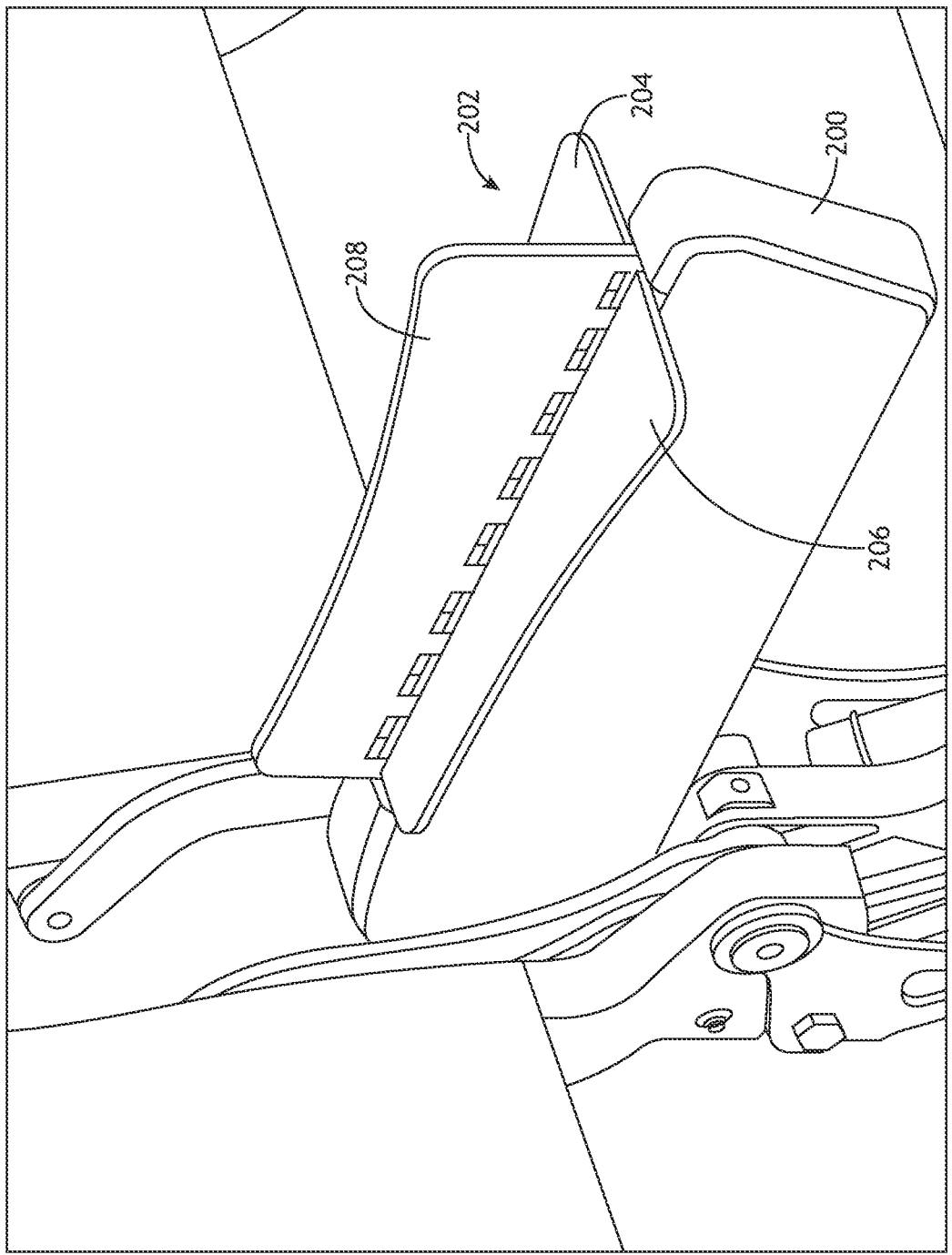
FIG. 2A shows a perspective, environmental view of an armrest with a deployable armrest extension during a stage of deployment according to an exemplary embodiment.
Figure 2B:
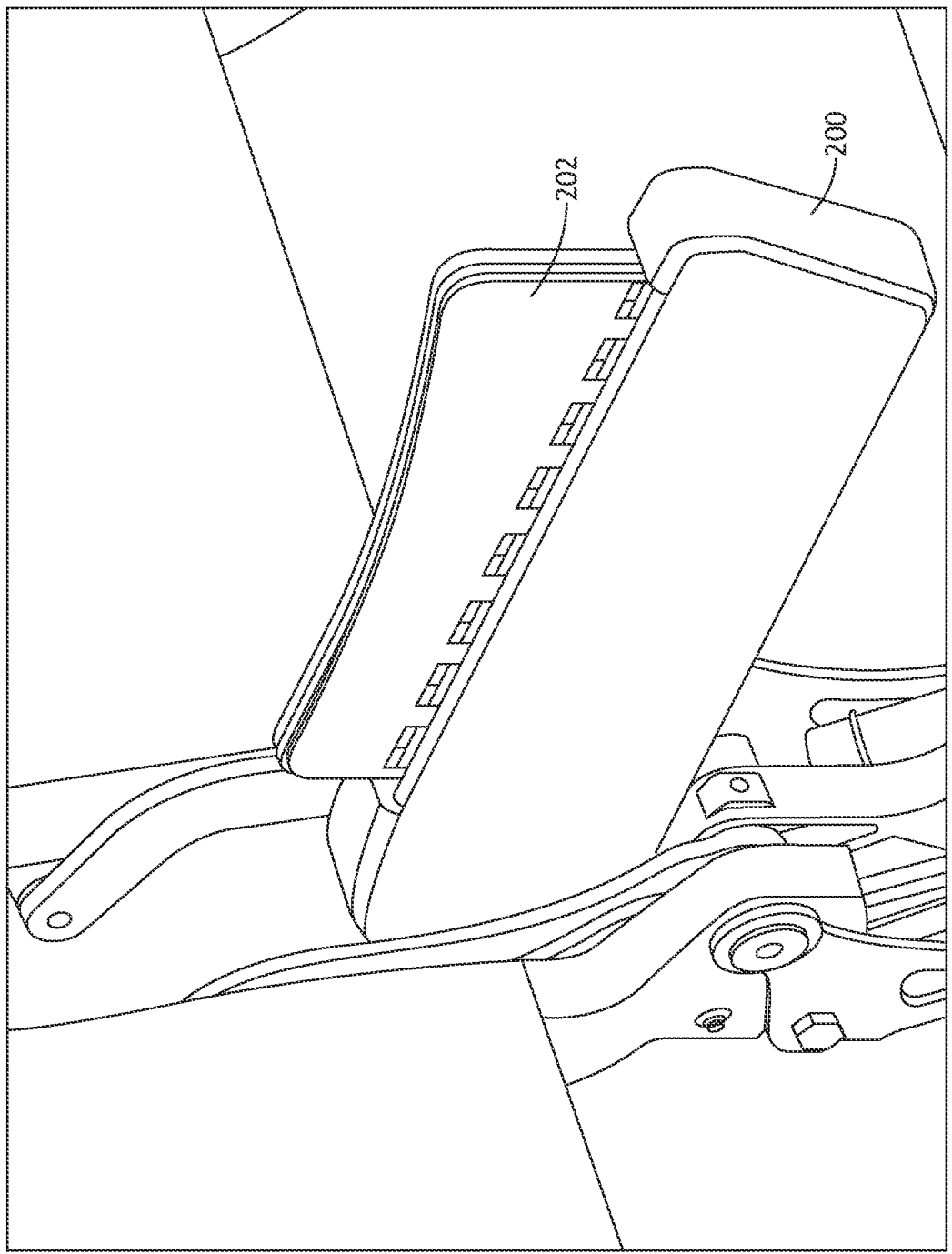
FIG. 2B shows a perspective, environmental view of an armrest with a deployable armrest extension during a stage of deployment according to an exemplary embodiment.
Figure 2C:
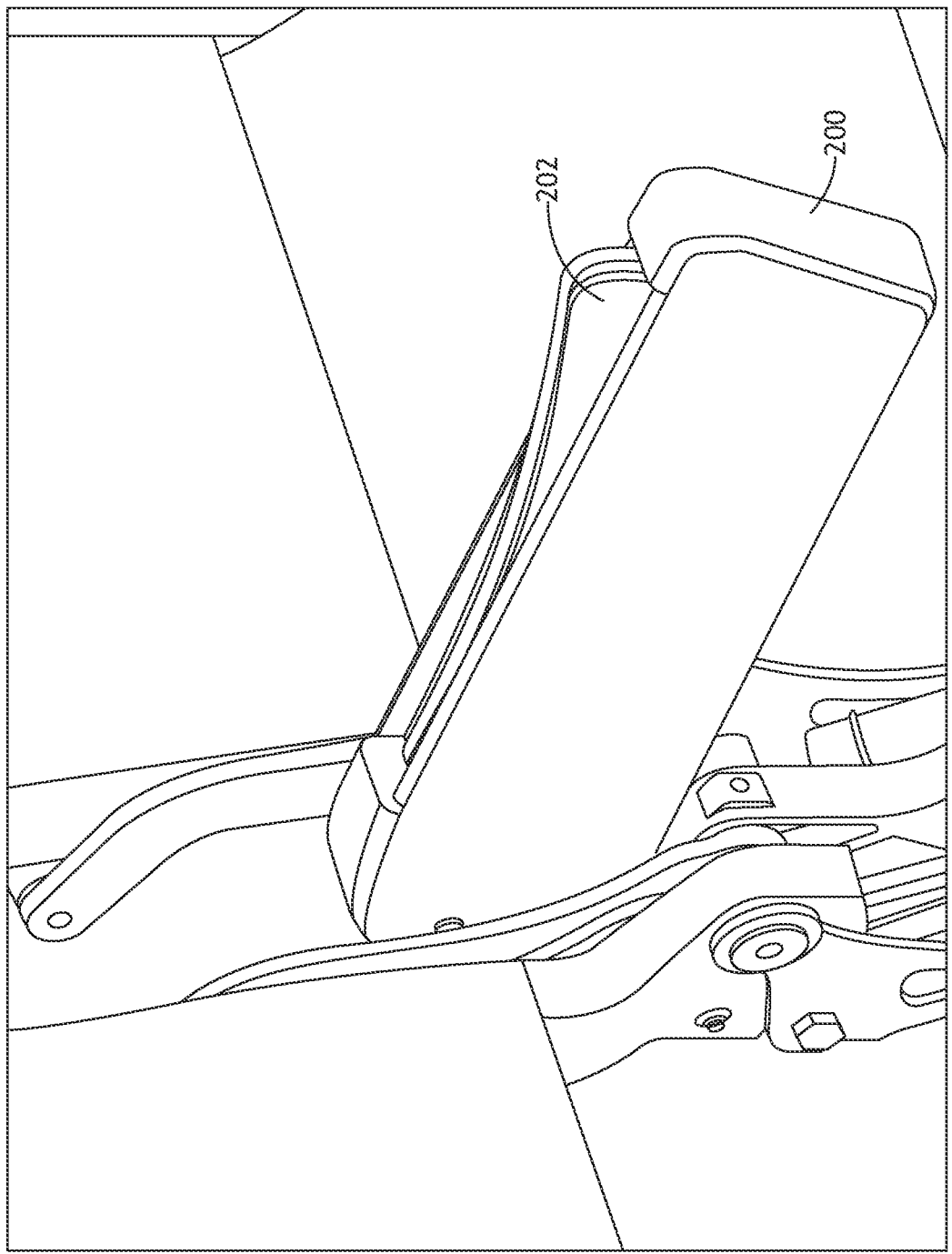
FIG. 2C shows a perspective, environmental view of an armrest with a deployable armrest extension during a stage of deployment according to an exemplary embodiment.
Figure 2D:
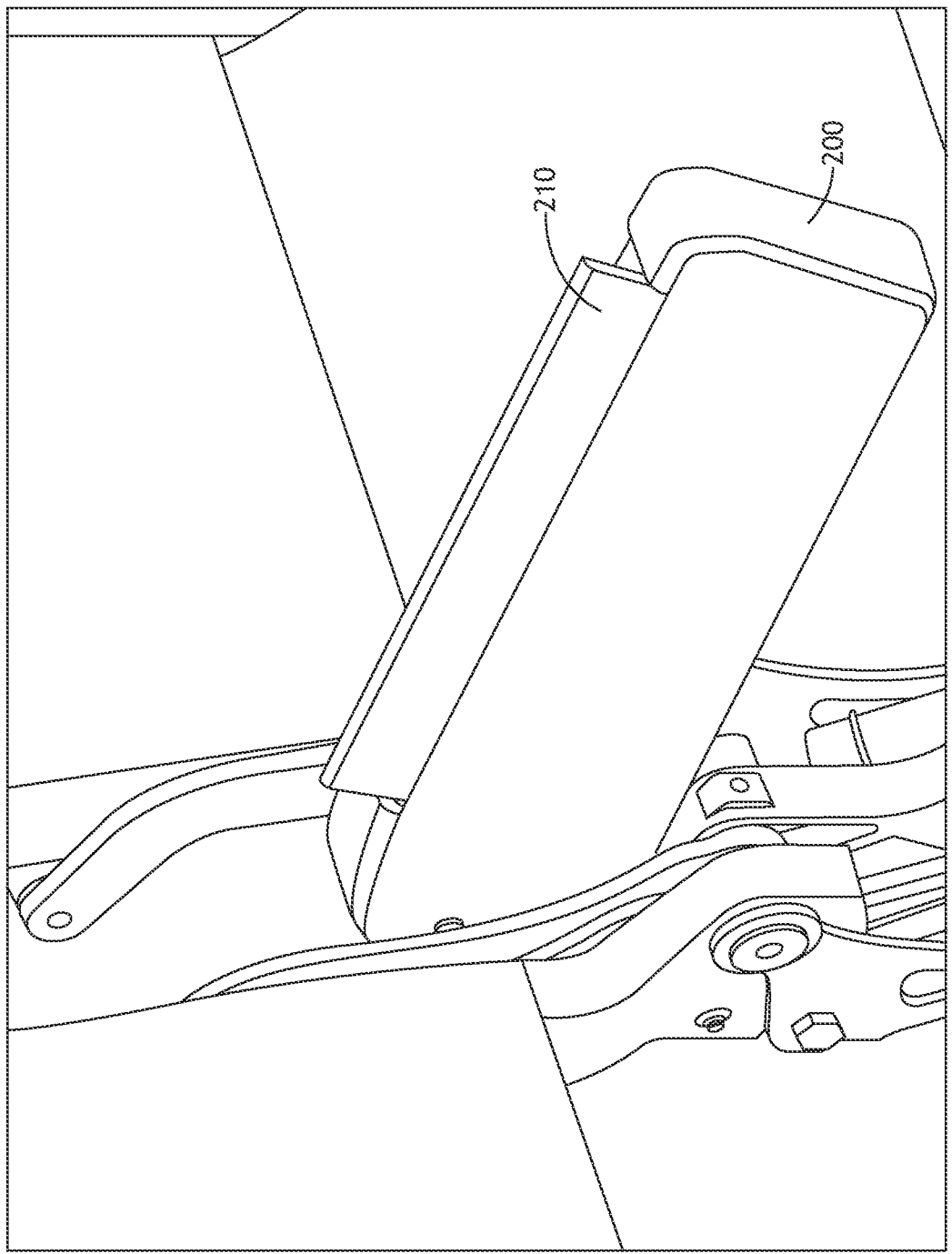
FIG. 2D shows a perspective, environmental view of an armrest with a deployable armrest extension during a stage of deployment according to an exemplary embodiment.
Figure 2E:
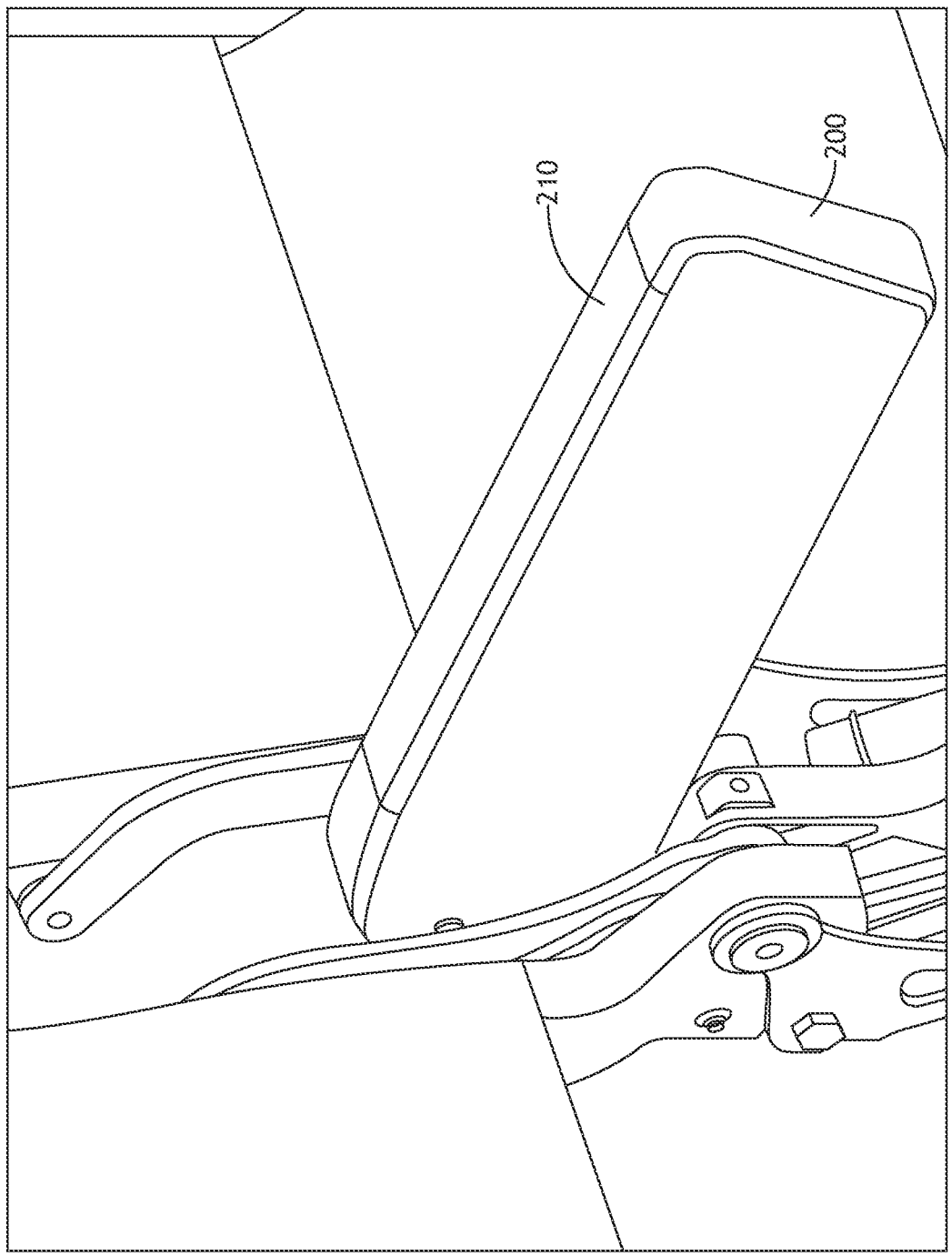
FIG. 2E shows a perspective, environmental view of an armrest with a deployable armrest extension during a stage of deployment according to an exemplary embodiment.

In at least one embodiment, as the deployable armrest extension 202 is translated downward, a linkage in the deployment mechanism 108 may actuate a top cap 210 from within the internal space defined by the armrest 200 along a guide channel (as in FIG. 2D). When the deployable armrest extension 202 is fully stowed, the top cap 210 closes to completely cover an opening in the top surface of the armrest 200 (as in FIG. 2E) to present a standard shared armrest surface.

Figure 3A:
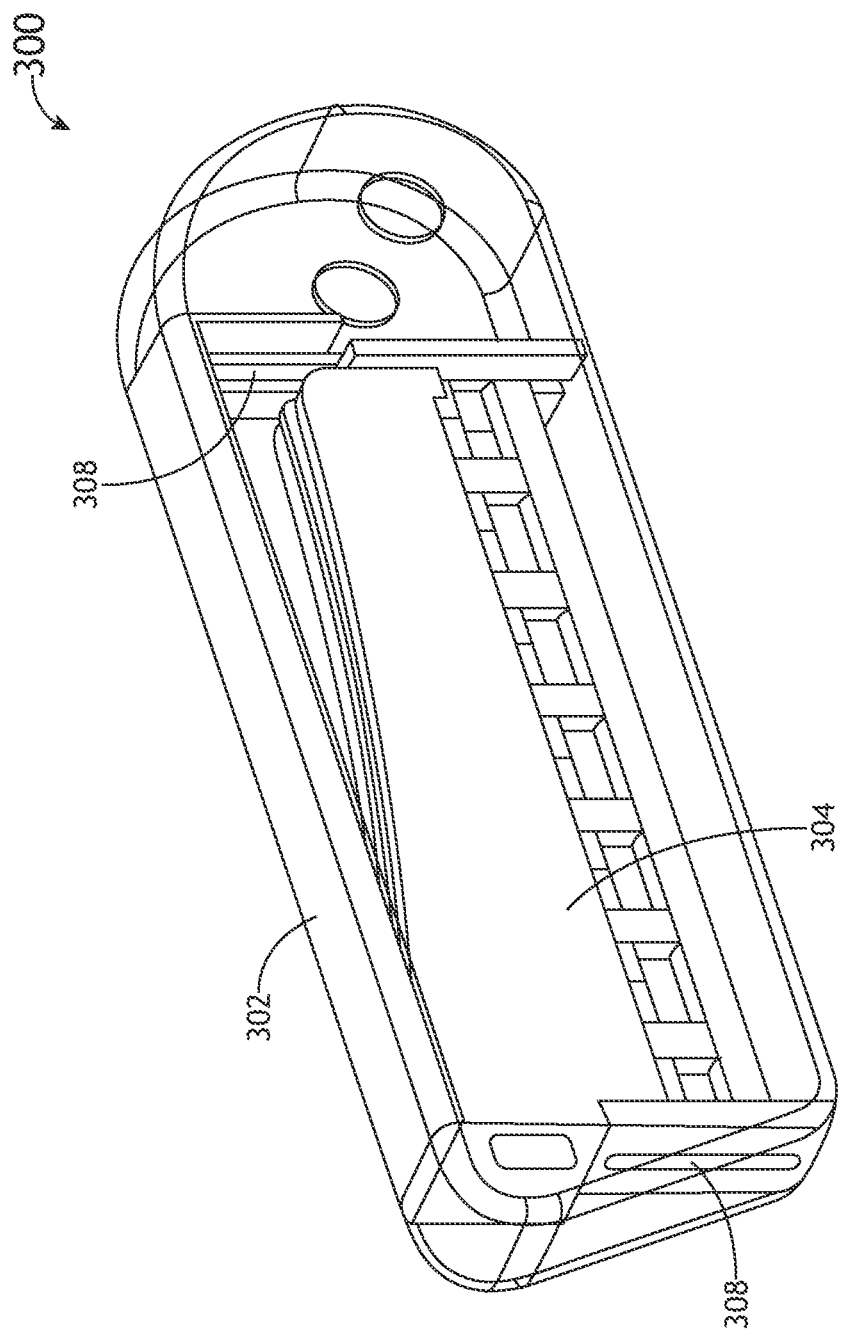
FIG. 3A shows a perspective view of an armrest with a deployable armrest extension during a stage of deployment according to an exemplary embodiment.
Figure 3B:
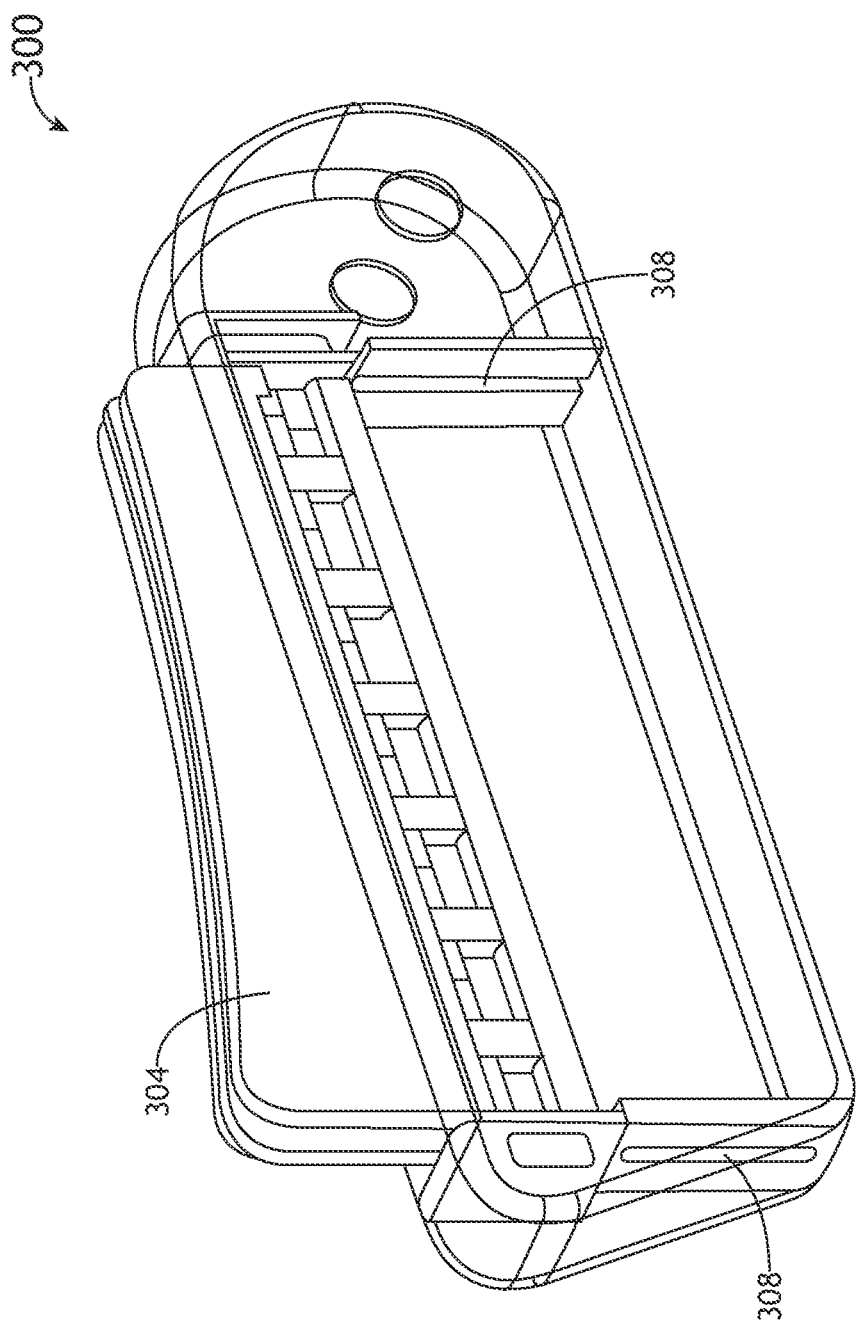
FIG. 3B shows a perspective view of an armrest with a deployable armrest extension during a stage of deployment according to an exemplary embodiment.
Figure 3C:
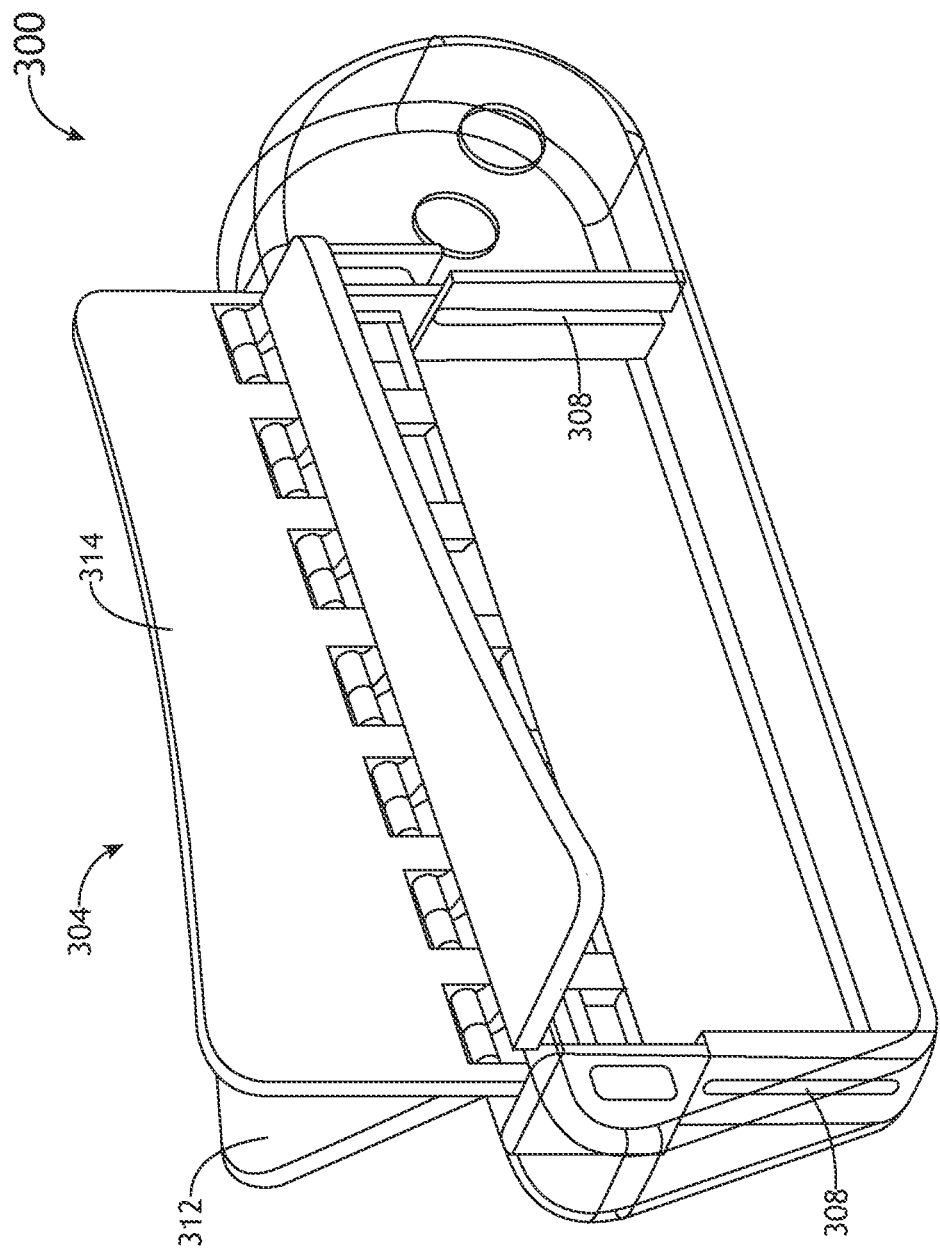
FIG. 3C shows a perspective view of an armrest with a deployable armrest extension during a stage of deployment according to an exemplary embodiment.

Referring to FIGS. 3A-3C, perspective views of an armrest with a deployable armrest extension according to an exemplary embodiment are shown at various stages of deployment. When fully stowed (as in FIG. 3A), the deployable armrest extension 304 is completely contained within an internal space defined by the body of the armrest 300. A top cap 302 covers an opening in a top surface of the armrest 300. The top cap 302 may be connected to via a linkage in a deployment mechanism 308 to the deployable armrest extension 304 such that as the deployable armrest extension 304 translate up through the opening in the top surface (as in FIG. 3B), the top cap 302 may translate down into the internal space, directed by a groove defined by the deployment mechanism 308.

When fully translated, (as in FIG. 3C), hinged leafs 310, 312 may be rotated from a central column 314 to create an expanded horizontal surface for each passenger, and segregating the passengers from incidental contact.

Figure 4B:
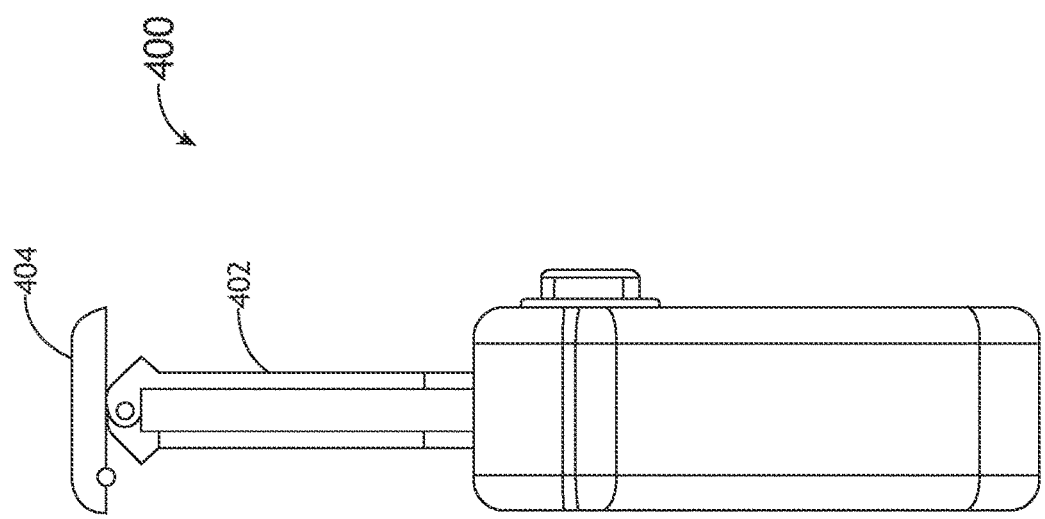
FIG. 4B shows a front view of an armrest with a deployable armrest extension during a stage of deployment according to an exemplary embodiment.

Referring to FIGS. 4A-4B, a perspective view and front view of an armrest 400 with a deployable armrest extension 402 according to an exemplary embodiment are shown. A top cap 404 is affixed to the deployable armrest extension 402 such that the top cap 404 translates out of an internal space 406 defined by the armrest 400 along with the deployable armrest extension 402. In at least one embodiment, the top cap 404 may be hinged to fold along a center line along when hinged leafs of the deployable armrest extension 402 are deployed horizontally.

Figure 5A:
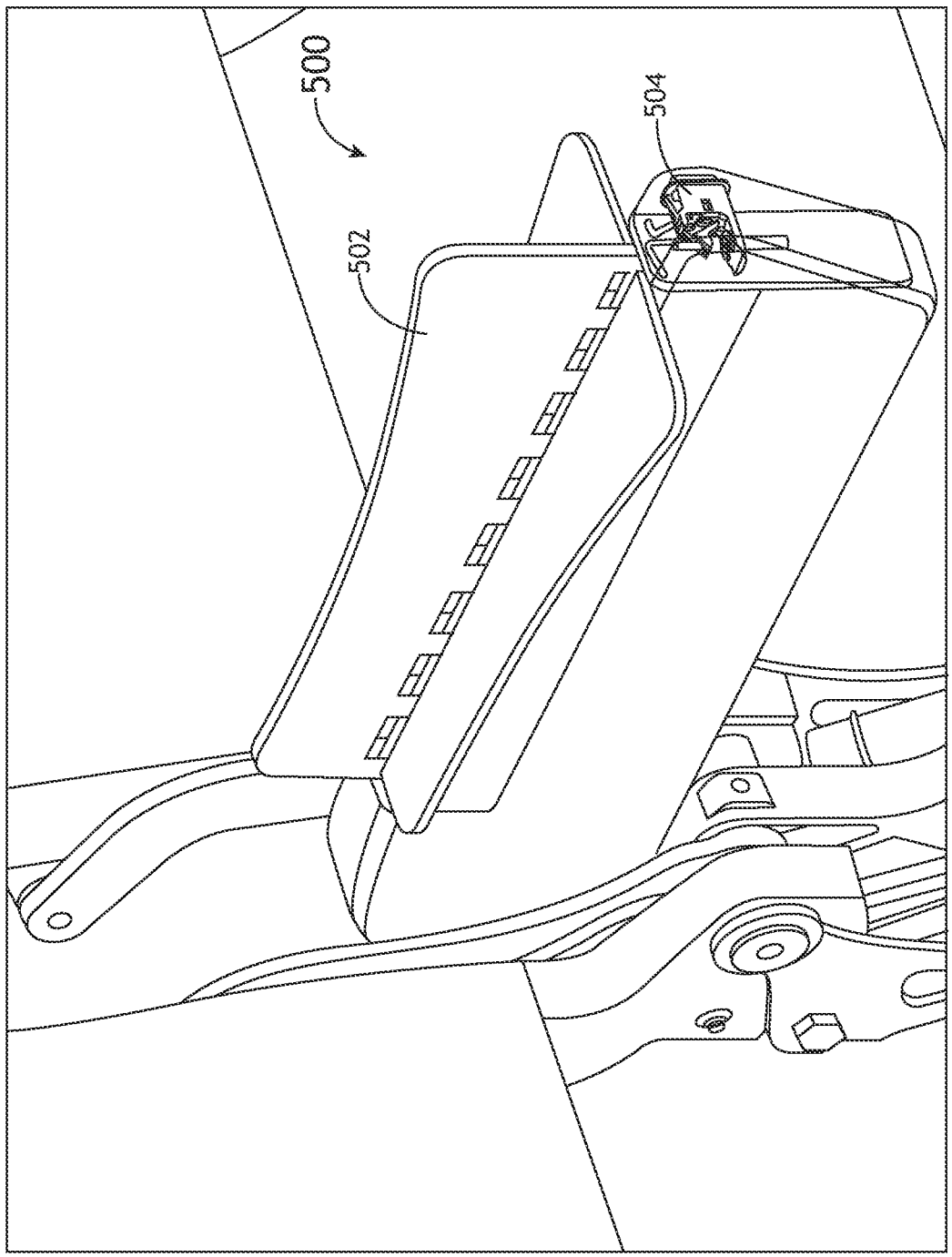
FIG. 5A shows a perspective view of a deployable armrest extension deployment mechanism according to an exemplary embodiment.
Figure 5B:
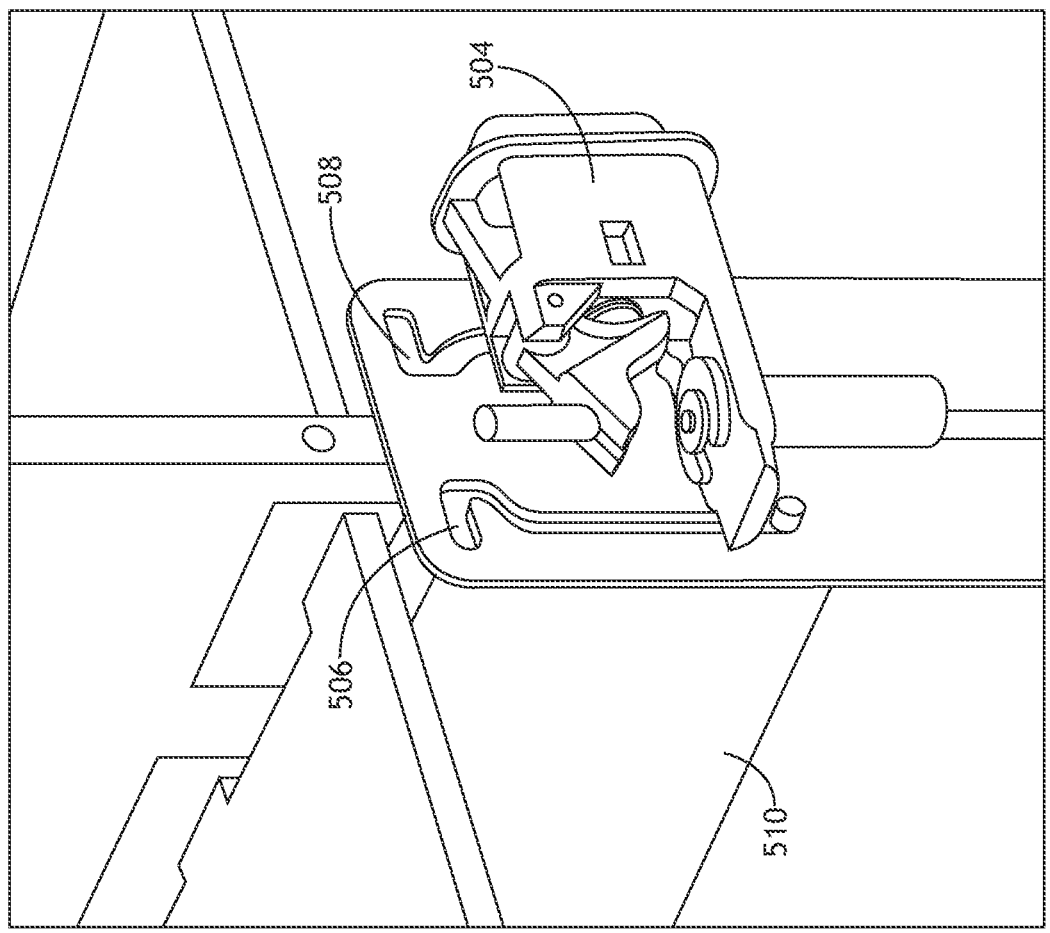
FIG. 5B shows a detail view of a deployable armrest extension deployment mechanism according to an exemplary embodiment.

Referring to FIGS. 5A-5B, a perspective view and detail view of a deployable armrest extension deployment mechanism according to an exemplary embodiment are shown. Where a deployable armrest extension 502 is deployable from an armrest 500, a deployment mechanism may control the movement of the deployable armrest extension 502. A latch 504 element locks the deployable armrest extension 502 in a stowed configuration until released by a passenger. An actuator may deploy the deployable armrest extension 502; the actuator may be connected to the deployable armrest extension 502 via linkage 506 such as a cable or rod. Such linkage 506 may utilize one or more pulleys 508. In at least one embodiment, a top cap 510 may also be connected to the latch 504 via the linkage 506 or some other corresponding linkage.

Figure 6:
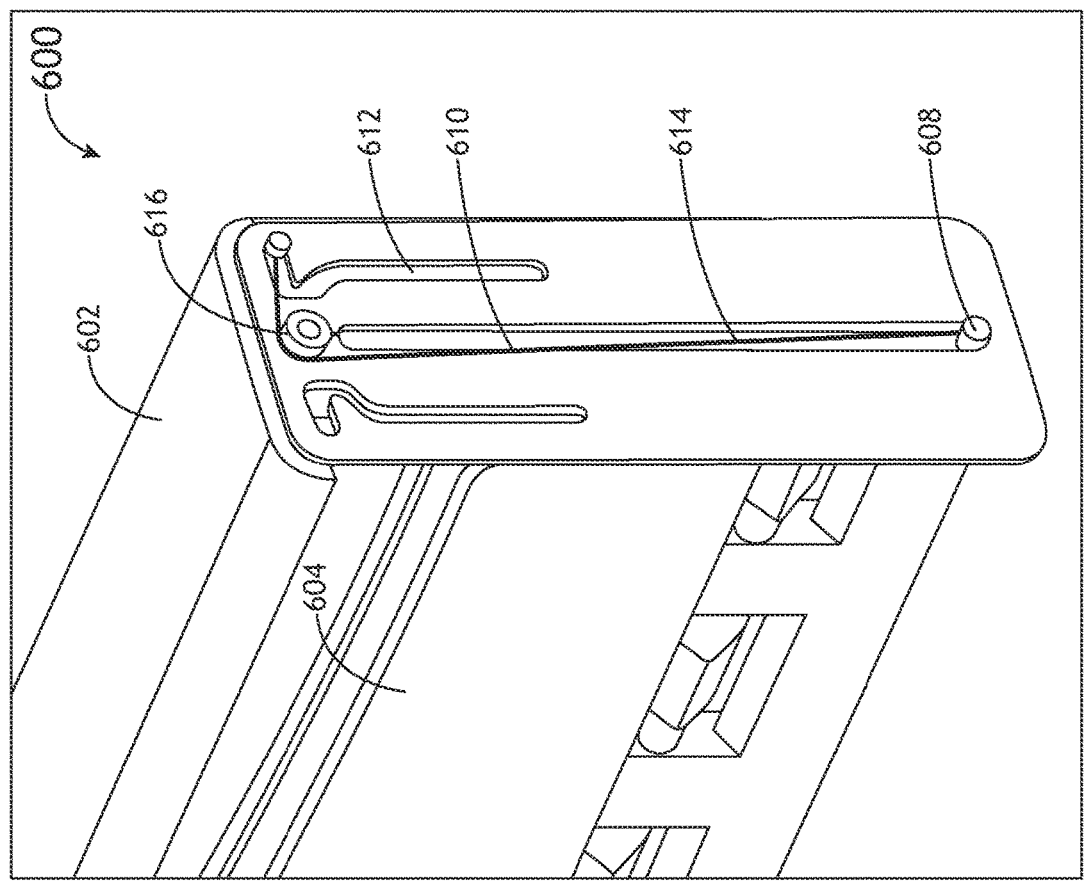
FIG. 6 shows a detail view of a deployable armrest extension deployment mechanism according to an exemplary embodiment.

Referring to FIG. 6, a detail view of a deployable armrest extension deployment mechanism 600 according to an exemplary embodiment is shown. In at least one embodiment, a top cap 602 is connected to deployable armrest extension 604 via a linkage 610 (such as a cable, elastic rope, etc.) connecting a top cap pin 606 to a deployable armrest extension pin 608. It may be appreciated that an elastic or semi-elastic linkage 610 may work to bias the deployable armrest extension 604 toward each of the stowed and deployed configurations.

The top cap pin 606 may engage a top cap translation channel 612 defined by the deployment mechanism 600. The top cap translation channel 612 may define a horizontal portion to direct the movement of the top cap 602 laterally during a first stage of deployment, and a vertical portion to direct the movement of the top cap 602 into the internal space of the armrest when the deployable armrest extension 604 is translating vertically. Likewise, the deployable armrest extension pin 608 may engage a deployable armrest extension channel 614 to direct the movement of the deployable armrest extension 604 vertically. In at least one embodiment, the linkage 610 may engage a pulley 616 to control the relative translation the top cap 602 and deployable armrest extension 604.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An aircraft armrest comprising:
   an armrest body defining an internal space and an opening in a top portion;
   a top cap configured to moveably cover the opening in the top portion; and
   a deployable armrest extension disposed in the internal space, comprising:
      one or more hinged leafs; and
      a deployment mechanism comprising:
         a translation channel configured to direct the deployable armrest extension upward through the opening in the top portion;
         one or more top cap directing channels configured to engage corresponding pins in the top cap and direct the top cap into the internal space; and
         a linkage connecting the corresponding pins to the deployable armrest extension to actuate movement of the top cap when the deployable armrest extension is deployed.

2. The aircraft armrest of claim 1, wherein the linkage comprises a cable and pulley.

3. The aircraft armrest of claim 1, wherein the deployment mechanism comprises:
   a linear actuator configured to bias the deployable armrest extension into a deployed configuration; and
   a release mechanism configured to retain the linear actuator until released.

4. The aircraft armrest of claim 1, wherein the deployment mechanism comprises a rotation arm configured to allow the deployable armrest extension to rotate out of the internal space.

5. The aircraft armrest of claim 4, wherein the top cap is configured to close and cover the opening in the top portion and provide a resting surface for the deployable armrest extension when deployed.

6. The aircraft armrest of claim 1, wherein the deployable armrest extension comprises a central column configured to remain vertical when the one or more hinged leafs are deployed horizontally.

7. The aircraft armrest of claim 1, wherein:
   the top cap is affixed to the deployable armrest extension;
   the deployable armrest extension is configured to vertically translate out of the internal space sufficiently for the one or more hinged leafs to rotate up into a horizontal configuration, and then translate back into the internal space.

8. A deployable armrest extension comprising:
   one or more hinged leafs; and
   a deployment mechanism comprising:
      a translation channel configured to direct the deployable armrest extension upward through an opening in a top portion of an armrest body;
      one or more top cap directing channels configured to engage corresponding pins in the top cap and direct the top cap into an internal space of the armrest body;
      a linkage connecting the corresponding pins to the deployable armrest extension to actuate movement of the top cap when the deployable armrest extension is deployed;
      a linear actuator configured to bias the deployable armrest extension into a deployed configuration; and
      a release mechanism configured to retain the linear actuator until released.

9. The aircraft armrest of claim 8, wherein the linkage comprises a cable and pulley.

10. The aircraft armrest of claim 8, wherein the deployment mechanism comprises a rotation arm configured to allow the deployable armrest extension to rotate out of the internal space.

11. The aircraft armrest of claim 10, wherein the deployment mechanism further comprises a translation channel configured to direct the deployable armrest extension upward through the opening in the top portion.

12. The aircraft armrest of claim 8, wherein the deployable armrest extension comprises a central column configured to remain vertical when the one or more hinged leafs are deployed horizontally.

* * * * *